United States Patent
Monga et al.

(10) Patent No.: US 7,984,154 B2
(45) Date of Patent: Jul. 19, 2011

(54) SYSTEM AND METHOD FOR TRANSLATING APPLICATION PROGRAM NETWORK SERVICE REQUESTS INTO ACTIONS AND PERFORMING THOSE ACTIONS THROUGH THE MANAGEMENT AND/OR CONTROL PLANE RESPONSIVE TO PREVIOUSLY DEFINED POLICIES AND PREVIOUS REQUESTS BY THE SAME OR ANOTHER APPLICATION PROGRAM

(75) Inventors: Indermohan Monga, Acton, MA (US); Bruce Schofield, Tyngsboro, MA (US); Franco Travostino, Arlington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 12/643,936

(22) Filed: Dec. 21, 2009

(65) Prior Publication Data

US 2010/0100625 A1 Apr. 22, 2010

Related U.S. Application Data

(63) Continuation of application No. 10/842,129, filed on May 10, 2004, now Pat. No. 7,664,838.

(51) Int. Cl.
*G06F 15/173* (2006.01)
*G06F 15/16* (2006.01)
*G06F 7/04* (2006.01)

(52) U.S. Cl. .................... 709/226; 709/206; 726/6

(58) Field of Classification Search .................... 709/226
See application file for complete search history.

(56) References Cited

U.S. PATENT DOCUMENTS 7,243,369 B2 * 7/2007 Bhat et al. .................... 726/6

* cited by examiner

*Primary Examiner* — Peling A Shaw
*Assistant Examiner* — Joiya M Cloud
(74) *Attorney, Agent, or Firm* — David A. Dagg

(57) ABSTRACT

Application program network service requests are translated into specific actions that are then performed through the management plane and/or control plane. The translations and resulting actions are responsive to previously defined policies for the communication network, and may further reflect processing of previous service requests by the same or another application program. The amount of resources available for use by a given application program may be predefined based on a globally defined network policy. Each service request obtained from an application program may be translated into multiple actions performed using various specific protocols and/or interfaces provided by either the management plane, the control plane, or both the management and control planes. Reports of network activity, status and/or faults for a requesting application program may be tailored to the requesting program's view of the network, and passed directly and exclusively to the requesting program.

21 Claims, 3 Drawing Sheets

SYSTEM AND METHOD FOR TRANSLATING APPLICATION PROGRAM NETWORK SERVICE REQUESTS INTO ACTIONS AND PERFORMING THOSE ACTIONS THROUGH THE MANAGEMENT AND/OR CONTROL PLANE RESPONSIVE TO PREVIOUSLY DEFINED POLICIES AND PREVIOUS REQUESTS BY THE SAME OR ANOTHER APPLICATION PROGRAM

CROSS-REFERENCE TO RELATED APPLICATIONS

The present application is a Continuation under 35 U.S.C. 120 of commonly assigned prior U.S. application Ser. No. 10/842,129, filed May 10, 2004 in the names of Indermohan Monga, Franco Travostino and Bruce Schofield, now allowed.

FIELD OF THE INVENTION

The present invention relates generally to communication network control and management, and more specifically to virtualization of the network management and control planes through an abstracted interface available to individual application programs, providing high-level, application-specific control of underlying network resources.

BACKGROUND OF THE INVENTION

A communications network may be viewed as a functional model made up of three functional "planes": a data plane, a control plane, and a management plane. This logical division supports separation of functions provided to application programs using the network to convey data, and functions related to network internal operation. Typical application programs send and receive data over the network via the data plane, for example by opening conventional software interfaces such as "sockets" that transmit and receive data over the network on behalf of the application using TCP/IP (Transmission Control Protocol/Internet Protocol).

The control plane consists of functions and associated resources used to dynamically perform distributed network control operations. Functions within the control plane relate to dynamic, distributed resource allocation, traffic engineering, load balancing, and performance optimization. Signaling is performed in the control plane, consisting of sending control signals that request specific operations to be performed. For example, control signals may be used to start or stop a transmission, as well as other operations. In telephony systems, one control signal is sent to establish a call, and another is sent to tear down (disconnect) the call. Routing protocols also operate in the control plane, enabling routers to dynamically determine appropriate paths on which data is forwarded through the network, report network changes, share information with other routers in the network, and allow the network to adjust to changing conditions. Examples of protocols that operate within the control plane include GMPLS (Generalized Multiprotocol Label Switching), RSVP (ReSerVation Protocol), and others.

The management plane is "stacked" above the control plane in the network model. During operation, the management plane uses interfaces to the control plane to access functionality provided by the control plane. Management plane operations relate to network global events such as bringing new devices or other resources on line, problem reporting, and error management. Management plane operations are generally more centralized and/or network-wide in comparison with those of the control plane. Accordingly, SLAs (Service Level Agreements) are provided through the management plane. Management plane operations include provisioning operations, such as those performed when setting up a telecommunications service for a particular customer. Protocols operative within the network management plane include SNMP (Simple Network Management Protocol), TL1 (Transaction Language 1), and others.

As application programs have become more complex, they have become more dependent on the operational characteristics of the communications network they use. Accordingly, services provided by the network directly affect the operation and performance of many applications. This is especially true in widely distributed network applications. For example, "grid-computing" (also known as "peer-to-peer" or "distributed" computing) application programs are examples of distributed network applications in which application resources are shared across geographically distributed systems to provide services to users, and that rely heavily on the communication services of the underlying network to operate correctly and efficiently. The socket interface to the data plane provides good support for applications simply needing to send and receive data. However, application programs have limited control over how the data they transmit and receive is handled within the network, and receive only limited feedback regarding errors occurring in the network that affect them. Additionally, application programs have no way of communicating their specific communication requirements to the network in advance of using the network to convey data.

The management and control planes are both capable of determining network resource allocation, and obtaining various types of status from the network. However, in existing systems, functions within the management and control planes must be accessed and used separately. Multiple protocols, both proprietary and standardized, work independently in the control and management planes to monitor and/or report on various specific aspects of the underlying network, interfacing to different layers of the network protocol stack. Typically, APIs (Application Programming Interfaces) are independently provided for operations and protocols associated with the control and management planes. In order for application programs to use these multiple interfaces, they need to understand which functionalities are provided through which protocols in which layers, and for which specific network elements, since different network element types are managed through different protocols. Thus, applications using existing systems are faced with the need to understand and use multiple protocols with regard to multiple network element types, that may be provided by multiple vendors, resulting in a high level of complexity at any application interface to the network outside the data plane. Multiple dedicated management tools are therefore needed, resulting in frequent reliance on static provisioning, or on hands-on management actions performed through network administrators or IT (Information Technology) administration infrastructure. Support personnel that manage applications must often interface with network management support personnel to interface to the network. As a consequence, both application program and network management is labor intensive, lacking effective, automated tools to support the network service needs of application programs. Application programs are basically at the mercy of the static design of the underlying network and configuration parameters to meet their changing needs. There is no way for application programs using the network to directly communicate their dynamic operational requirements to the network.

For the above reasons and others, it would be desirable to have a new system that allows unified, high-level functional access to operational characteristics of a communications network on an application program specific basis. The system should be capable of transparently manipulating protocols and functions in both the management and control planes in response to application program requests. The system should accordingly have direct access to control plane functionality, without having to go through the management plane.

SUMMARY OF THE INVENTION

In accordance with principles of the invention, a method and system are disclosed for translating application program network service requests into specific actions that are then performed through the management plane and/or control plane. The translations and resulting actions performed by the disclosed system are responsive to previously defined policies for the communication network, and may further reflect processing of previous service requests by the same or another application program. For example, the amount of resources available for use by a given application program may be predefined based on a globally defined network policy. Each service request obtained from an application program may be translated into multiple actions performed using various specific protocols and/or interfaces provided by either the management plane, the control plane, or both the management and control planes. Reports of network activity, status and/or faults for a requesting application program may be tailored to the requesting program's view of the network, and passed directly and exclusively to the requesting program.

The disclosed system provides a network service interface to one or more application programs. The disclosed network service interface provides application programs with a high level, application specific view of the communication network, and high-level functional access to management plane and control plane functions and protocols. The disclosed system generates an abstracted, "virtualized" view of the network and network services that is specific to individual application programs, and provided within the name scope of the application program. The interface contextualizes the view of the network to the application program, and supports network service designations at a functional level relevant to the application user's view of application services and network elements in the communication network.

Thus, and as further described below, the disclosed system advantageously provides application programs with the ability to access application-scoped notifications from the network, resulting in intelligent fault compartmentalization between applications. The application program can further view a list of available network capabilities, reflecting network policies, and then customize its network service access as needed within those policies. In an exemplary embodiment, the application program is provided with the ability to choose a circuit switched path using optical switching, versus a packet switched path using the IP (Internet Protocol) to accomplish its desired QoS (Quality of Service). Accordingly, an application program can use the disclosed system to obtain an individualized service with respect to other applications that is consistent with the policies defined for the network, and specify and schedule network access with a certain QoS ahead of time. Policies input to the disclosed system can control access by specific applications to control or management layer functions based on policies of a network service provider. As a result, one application can be given higher priority than another with regard to certain network resources, and different applications can be allowed access to different functions, such that the specific functions and parameters can be controlled and defined on an application specific basis.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
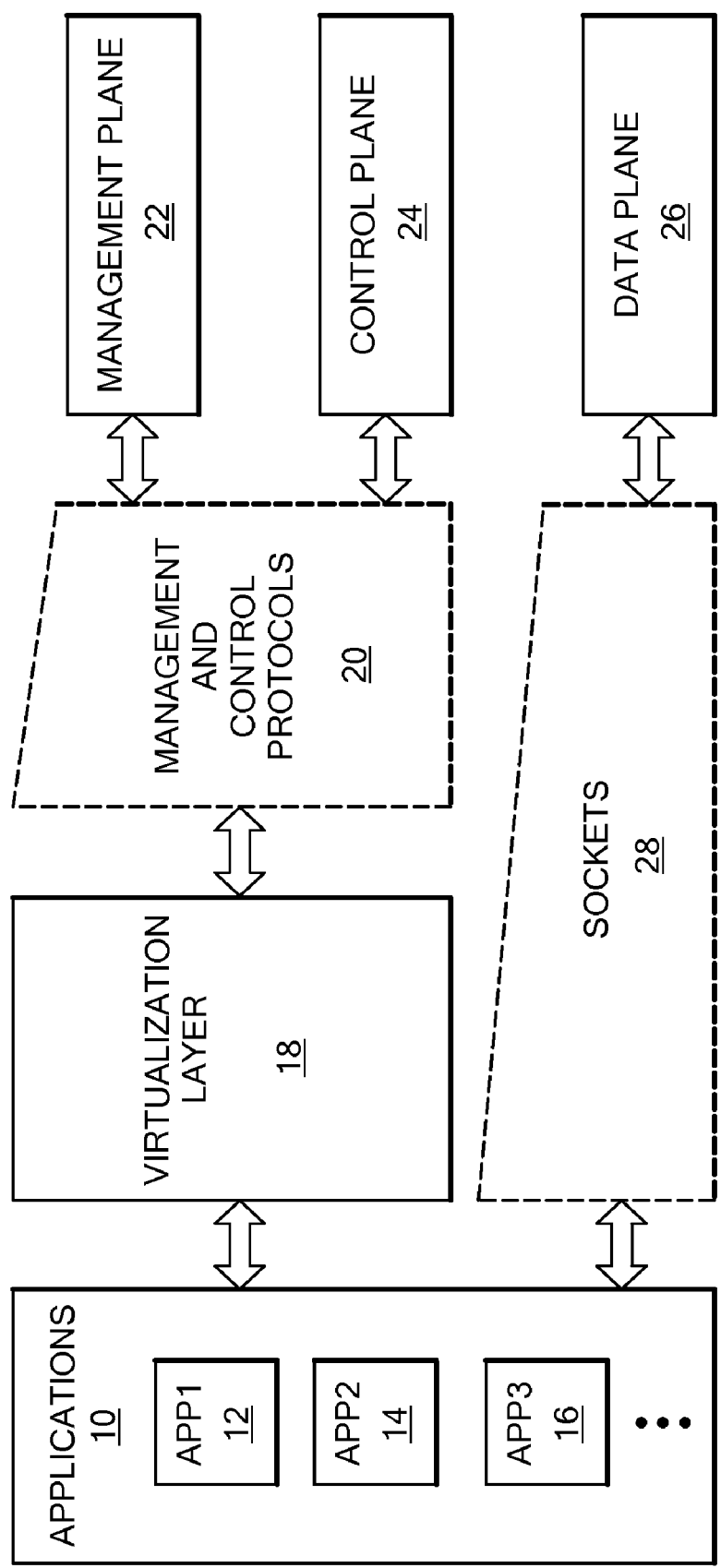
FIG. 1 is a block diagram illustrating an embodiment of the disclosed system.

FIG. 1 shows an illustrative embodiment of the disclosed system, including a virtualization layer 18 communicable with a number of application programs ("applications") 10, shown including individual applications 12, 14, and 16. The applications 10 may include any specific type of application program, including, but not limited to, database, customer resource management (CRM), human resources, medical applications, and/or any other appropriate application for a particular embodiment or deployment. The virtualization layer 18 is communicable with management and control protocols interface logic 20, which is operable to communicate with the management plane 22 and the control plane 24 of a communications network. The applications 10 are further communicable with sockets 28, which provide TCP/IP data communication support to the applications 10 over the communications network through the data plane 26. The applications 10 are shown using the sockets 28 to interface to the data plane 26 for example only, and any appropriate interface may be used for this purpose in the alternative.

The applications 10, virtualization layer 18, management and control protocols interface logic 20, and sockets 28 may, for example, be implemented using computer program code stored in one or more computer program memory devices associated with and communicable with one or more processors in one or more computer devices, such as personal computers, workstations, or the like. Such computer devices may further include operating system software and one or more input/output (I/O) devices coupled to the communication network associated with the management plane 22, control plane 24, and data plane 26. The communications network associated with the management plane 22, control plane 24, and data plane 26 may, for example, include some number of network devices, such as switches, routers, bridges, or other types of devices, and use any specific protocols and media types for management, control, and conveying data. The management plane 22, control plane 24, and data plane 26 may be embodied using software or hardware logic, partly or completely contained within the network devices of the communication network, and/or the computer device(s) on which the applications 10, virtualization layer 18, management and control protocols interface logic 20, and sockets 28 are stored and execute.

As in conventional systems, the management plane 22 includes functions relating to network events such as bringing new devices or other resources on line, problem reporting, and error management. SLAs (Service Level Agreements) may be specified through the management plane 22. Operations in the management plane 22 include provisioning operations, such as those performed when setting up a telecommunications service for a particular customer.

Also as in conventional systems, the control plane 24 embodies functions and resources for dynamically performing network control operations on a distributed basis. Functions within the control plane 24 relate to resource allocation, traffic engineering, load balancing, performance optimization and signaling. Control signals requesting specific operations may be passed through the control plane 24, such as control signals for starting or stopping a transmission, or starting and tearing down a call. Various routing protocols may also be supported in the control plane 24, for dynamic determination of data paths across through the network, reporting of network changes, sharing of status information across the network, and allowing the network to adjust to changing conditions.

During operation of the components shown in FIG. 1, the virtualization layer 18 provides a network service interface to one or more of the application programs 10. The network service interface of the virtualization layer 18 provides one or more of the application programs with a high level, application specific view of the communication network, and direct, high-level access to functions and specific protocols of both the management plane 22 and control plane 24. The virtualization layer 18 generates a virtual view of the network and network services specific to individual ones of the application programs 10, provided within the name scope of individual ones of the application programs 10. The interface provided by the virtualization layer 18 for each of the application programs 10 contextualizes the view of the network to that application program, and supports high-level, functional network service designations.

The virtualization layer 18 translates application program network service requests into specific actions to be performed through interfaces and/or protocols associated with the management plane 22 and/or control plane 24. The virtualization layer 18 then performs those actions using the management and control protocols interface 20. The virtualization layer 18 may use a set of previously defined policies to determine the translations and resulting actions performed in response to a given request. The virtualization layer 18 may further maintain per-application state regarding communication network resource allocation, so that the translations and resulting actions also reflect processing of previous service requests by the requesting application, or by another application program. Each service request received by the virtualization layer 18 from one of the application programs 10 may be translated into multiple actions performed using various specific protocols and/or interfaces provided by either the management plane, the control plane, or both the management and control planes.

The virtualization layer 18 further processes requests from the applications 10 to provide reports of network activity, status and/or faults on an application program specific basis. Accordingly, the virtualization layer 18 may operate to provide event reporting that is specific to network traffic associated with a specific one of the applications 10 to that specific application, and only to that specific application. Such event reporting may relate to performance of network elements within paths used to convey data for that specific application, or to specific resources within such network elements. Such reporting may further describe the processing of data packets or messages associated with the requesting application within the communications network. Moreover, the reporting provided by the virtualization layer for a given requesting application program may use names of resources or network elements within the communications network that are within the name scope (or "name space") of the requesting application program. Thus the virtualization layer 18 operates to provide a targeted performance view on an application specific basis describing performance of portions of the communications network relevant to specific requesting application programs.

For example, one of the applications 10 may request a service through the virtualization layer 18 that would result in the virtualization layer 18 providing one or more application-specific alarms to the requesting application. The virtualization layer 18 would then translate the request into one or more actions performed through the management and control protocols interface 20 with regard to network resources used to convey data on behalf of the requesting application. The requesting application may want to be notified in the event of a network outage relating to such resources, so that an application manager supporting that application can perform problem solving steps directly through the application itself, without having to contact network management personnel.

Similarly, the virtualization layer 18 may enable a given application program to refer to network elements using names that are within a name scope of the application program. For example, an application program may communicate a given request to the virtualization layer 18 with regard to a port on an interface card of a network device in the communication network using a predetermined name for that port that is known within the name scope of that application program.

Figure 2:
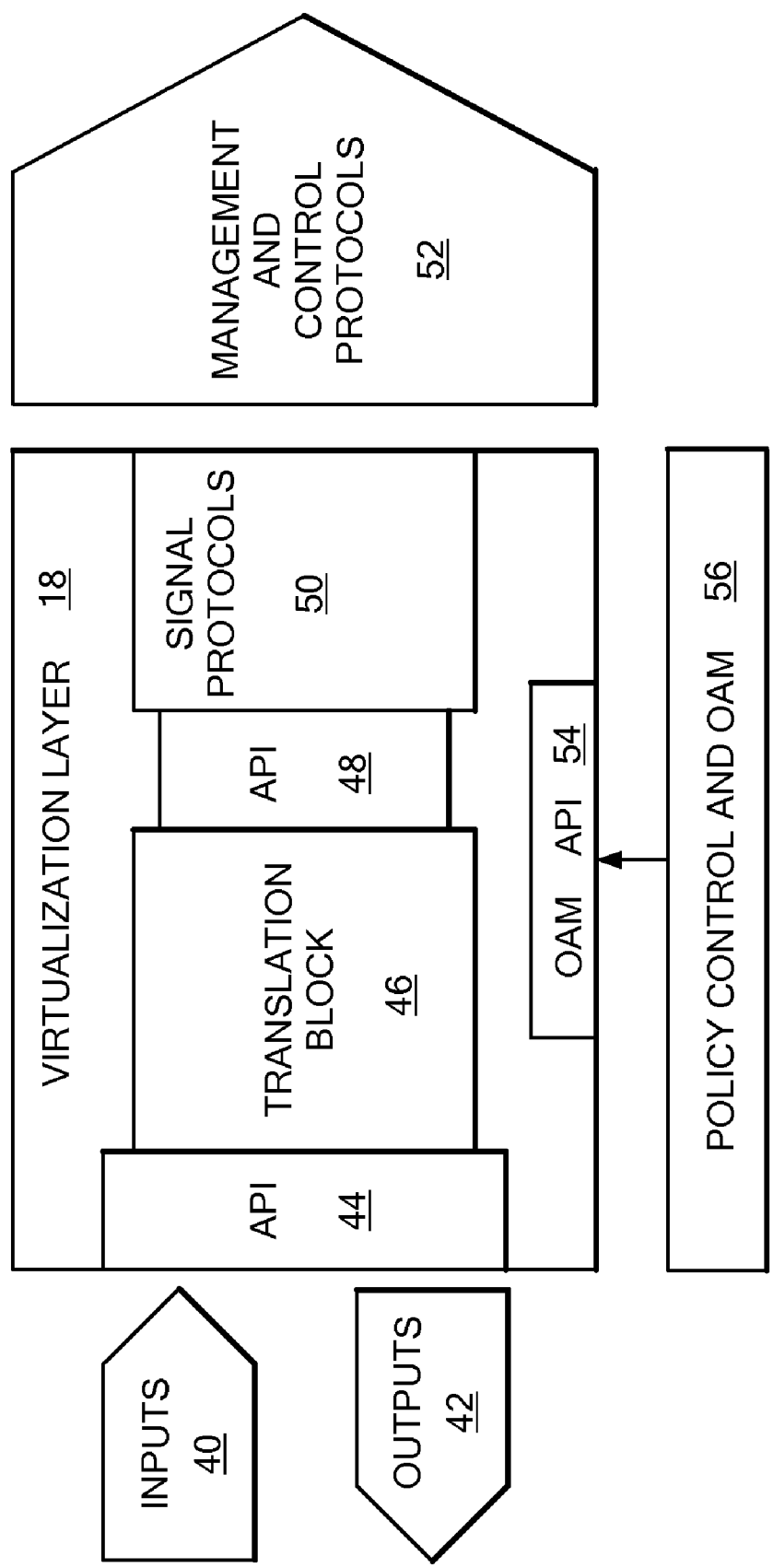
FIG. 2 is a block diagram showing the design of an embodiment of the virtualization layer provided by the disclosed system.

FIG. 2 shows a design of an illustrative embodiment of the virtualization layer 18 in FIG. 1, including an Application Programming Interface (API) 44 for receiving inputs 40 from and providing outputs 42 to one or more application programs. The inputs 40 and outputs 42 may, for example, consist of messages passed between the virtualization layer 18 and specific application programs. The API 44 interfaces with a translation logic block 46, which interfaces to an API 48 to signaling protocols interface logic 50. The signaling protocols interface 50 is operable to communicate with various specific protocols and/or interfaces of the management and control protocols 52, which operate over the management and control planes 22 and 24 shown in FIG. 1. The signaling protocols interface 50 may, for example, include signaling "plug-in" modules for specific network control protocols.

The translation block 46 includes logic for performing translation between application requests received from the API 44 and commands passed to the API 48, as well as translation of information received from the API 44 into application specific outputs to be passed through the API 44 to individual applications. The API 48 enables management of different signaling protocols and other functions and interfaces in the management and control protocols 52 through a common, abstracted interface to the translation block 46. Accordingly, the management and control protocols 52 can transparently encompass various protocols of both the management and control planes.

The policy control and OAM (Operations, Administration and Management) logic block 56 provides network administration policy control inputs to an OAM API 51. The policy information provided from the policy control and OAM block 56 includes controls applicable to one or more of the applications using the virtualization layer 18. Policy information provided through the OAM API 54 is available to the various logic blocks within the virtualization layer 18.

The specific management and control plane protocols 52 accessible to the virtualization layer 18 include protocols that control, monitor and/or report on various aspects of the network. Such protocols may span multiple network layers, and include management plane protocols such as SNMP (Simple Network Management Protocol), TL1 (Transaction Language 1), and others. Control plane protocols may include GMPLS (Generalized Multiprotocol Label Switching), RSVP (ReSerVation Protocol), and others. Other functionality and/or protocols accessible to the virtualization layer 18 may include a Web interface through the HTTP (HyperText Transport Protocol, legacy IP/QoS services through RSVP, (G)MPLS (Generalized MultiProtocol Label Switching), services through CR-LDP and/or RSVP-TE (ReSerVation Protocol-Traffic Engineering), UNI (User-to-Network Interface) services through ASTN (Automatically Switched Transport Network) UNI and/or MEF (Metro-Ethernet Forum) UNI, as well as Layer 2/RPR (Resilient Packet Ring) services through SNMP, UN1 or TL1 protocols. Similarly, CIM (Common Information Model), RAPI (Remote Access Programming Interface), NSIS (Next Steps in Signaling), GUI (Graphical User Interface), SIP (Session Initiation Protocol), and/or customized, purpose-specific protocols or services may be supported.

Some of the services offered by the virtualization layer 18 may, for example, include 1) providing application access to application-scoped notifications from the network, 2) providing a list of available, application specific capabilities of the network and the ability to customize network service access on an application specific basis, 3) providing the ability for an application to choose a circuit switched path using optical switching versus a packet switched path using IP to accomplish a desired QoS, 4) providing individualized services to specific applications based on predetermined policies, and 5) providing the ability for individual applications to specify and schedule network services in advance with specific QoS parameters for specific time periods with respect to certain network resources.

Figure 3:
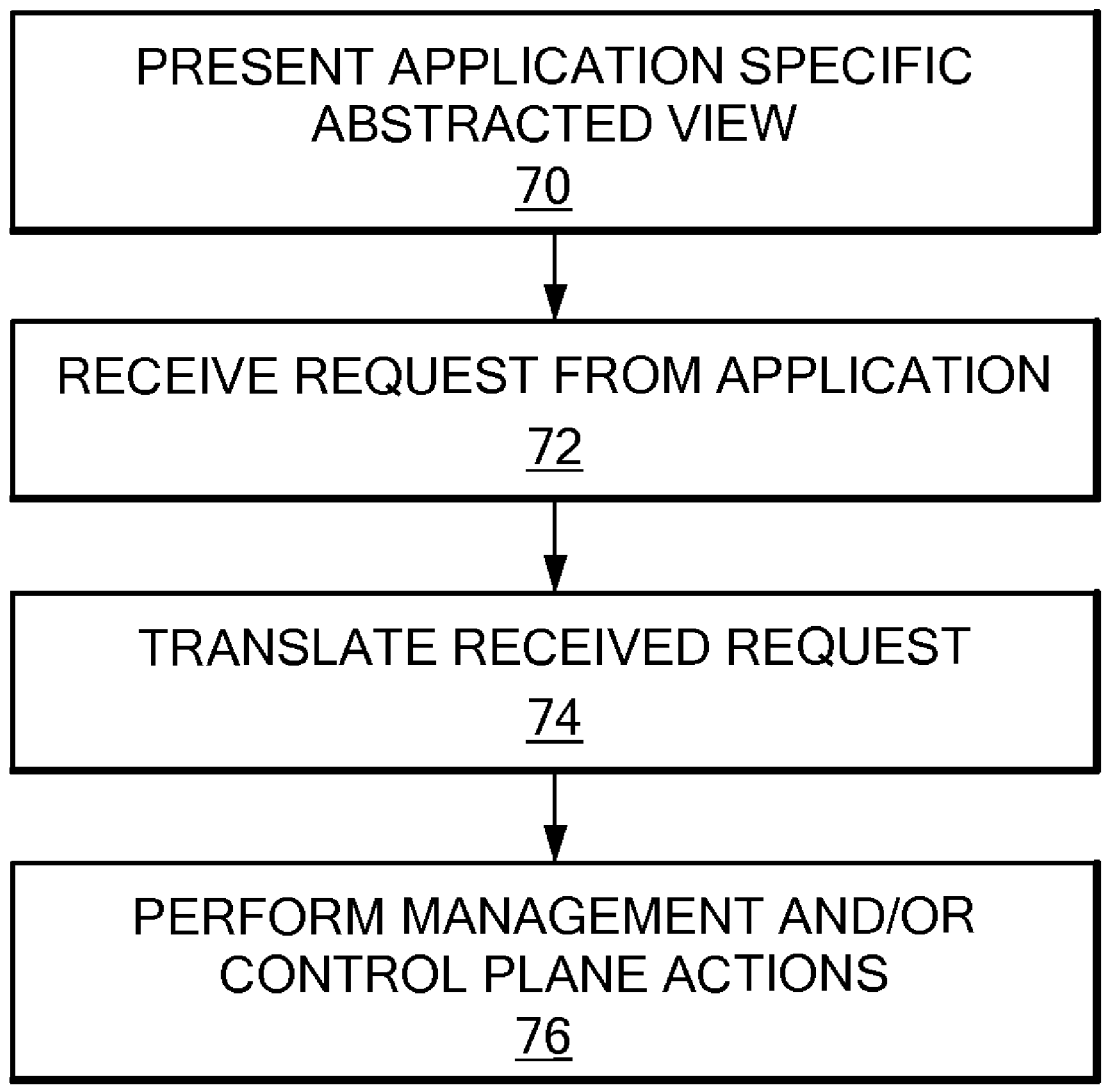
FIG. 3 is a block diagram illustrating steps performed by an embodiment of the disclosed system.

FIG. 3 is a block diagram illustrating steps performed by an embodiment of the disclosed system. At step 70, the disclosed system operates to provide an application specific view of the communications network to one or more application programs. At step 72, the disclosed system receives a request from an application program. The disclosed system then operates at step 74 to translate the request received at step 72 into one or more actions to be performed using control plane and/or management plane functions or protocols. At step 76, the disclosed system performs the actions determined at step 74.

The disclosed system advantageously improves an application program's performance through its interaction with the network, and allows applications to leverage complex network capabilities through a simple interface. The disclosed system provides a single virtualization layer for multiple protocols encompassing both the management and the control plane. The disclosed system conveniently translates functional requests from individual applications to capabilities of the management and control planes, providing a high-level network interface, in which the underlying protocols are transparent to the requesting application program.

FIGS. 1-3 are flowchart and block diagram illustrations of methods and apparatus (systems) that may be embodied using software and/or hardware logic components. It will be understood that each block of the illustrations, and combinations of blocks in the illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the illustrative block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks within each figure. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the figures. Alternatively, the functions necessary to implement the invention may alternatively be embodied in part or in whole using hardware logic components such as Application Specific Integrated Circuits or any other specific types of hardware circuits, or some combination of hardware components and software. Accordingly, the blocks in the block diagrams of FIGS. 1 and 2 and/or the flowchart of FIG. 3 may be implemented in whole or in part using such hardware logic.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

We claim:

1. A system including a non-transitory computer readable medium having program logic for providing a network service interface stored thereon, wherein said network service interface is available to a plurality of application programs, said program logic performing steps comprising:

obtaining a predetermined resource allocation policy applicable to at least one resource in a communications network;

obtaining at least one request from one of said plurality of application programs, wherein said request includes an application specific network service request for communication capabilities of said communications network that are only available to said one of said plurality of application programs, wherein said at least one resource comprises a network element within a path used to convey data packets of said one of said plurality of application programs through said communications network;

processing said request responsive to at least one parameter provided in said request and said predetermined policy, including translating said request into at least one selected protocol level command, said translating includes automatically selecting said selected protocol level command from a plurality of protocol level commands corresponding to management plane and control plane operations of said communications network; and wherein said request designates said path as a circuit switched path to carry said data packets of said one of said plurality of application programs over said communications network, and wherein said processing said request includes selecting said at least one protocol command to set said circuit switched path to carry said data packets of said one of said plurality of application programs over said communications network.

2. The system of claim 1, said steps performed by said program logic further comprising:
performing said at least one selected protocol level command.

3. The system of claim 2, said steps performed by said program logic further comprising:
determining a status representative of said at least one resource in said communication network, wherein said status reflects at least one network outage associated with said at least one resource.

4. The system of claim 3, said steps performed by said program logic further comprising:
providing said status to said one of said plurality of application programs.

5. The system of claim 1, wherein said processing of said at least one request includes denying said request in the event that said request conflicts with said predetermined resource allocation policy.

6. The system of claim 1, wherein said at least one parameter comprises a name associated with said at least one resource in said communications network, wherein said variable is in a name scope of said one of said plurality of application programs.

7. The system of claim 1, wherein said processing of said at least one request includes processing said request responsive to previous processing of at least one previous request received from said one of said plurality of application programs.

8. The system of claim 3, wherein said status represents detection of a fault relating to said at least one resource.

9. The system of claim 1, wherein said circuit switched path is an optically switched path.

10. The system of claim 1, wherein said predetermined resource allocation policy designates a higher priority for allocation of at least one resource in said communications network for said one of said plurality of application programs with respect to another one of said plurality of application programs.

11. A method of providing a network service interface, wherein said network service interface is available to a plurality of application programs executing in a computer system including at least one processor communicably coupled to a memory, comprising:
obtaining a predetermined resource allocation policy applicable to at least one resource in a communications network;
obtaining at least one request from one of said plurality of application programs, wherein said request includes an application specific network service request to view communication capabilities of said communications network that are only available to said one of said plurality of application programs, wherein said at least one resource comprises a network element within a path used to convey data packets of said one of said plurality of application programs through said communications network;
processing said request responsive to at least one parameter provided in said request and said predetermined policy, wherein said processing includes translating said request into at least one selected protocol level command, wherein said translating includes automatically selecting said selected protocol level command from a plurality of protocol level commands corresponding to respective management plane and control plane operations of said communications network; and
wherein said request designates said path as a circuit switched path to carry said data packets of said one of said plurality of application programs over said communications network, and further comprising selecting said at least one protocol command to set said circuit switched path to carry said data packets of said one of said plurality of application programs over said communications network.

12. The method of claim 11, further comprising:
performing said at least one selected protocol level command by executing program code for said at least one selected protocol level command.

13. The method of claim 12, further comprising:
determining a status representative of said at least one resource in said communication network, wherein said status reflects at least one network outage associated with said at least one resource.

14. The method of claim 13, further comprising:
providing said status to said one of said plurality of application programs.

15. The method of claim 11, further comprising:
denying said request in the event that said request conflicts with said predetermined resource allocation policy.

16. The method of claim 11, wherein said at least one parameter comprises a name associated with at least one resource in said communications network, wherein said variable is in a name scope of said one of said plurality of application programs.

17. The method of claim 11, wherein said processing of said request is responsive to processing of at least one previous request received from said one of said plurality of application programs.

18. The method of claim 13, wherein said status represents detection of a fault relating to said at least one resource.

19. The method of claim 11, wherein said circuit switched path is an optically switched path.

20. The method of claim 11, wherein said predetermined resource allocation policy designates a higher priority for allocation of at least one resource in said communications network for said one of said plurality of application programs with respect to another one of said plurality of application programs.

21. A computer program product including a computer readable storage medium having executable program logic stored thereon for providing a network service interface, wherein said network service interface is available to a plurality of application programs, said program logic comprising:
program logic for obtaining a predetermined resource allocation policy applicable to at least one resource in a communications network;
program logic for obtaining at least one request from one of said plurality of application programs, wherein said request includes an application specific network service request to view communication capabilities of said communications network that are only available to said one of said plurality of application programs, wherein said at least one resource comprises a network element within a path used to convey data packets of said one of said plurality of application programs through said communications network;

program logic for processing said request responsive to at least one parameter provided in said request and said predetermined policy, wherein said processing includes translating said request into at least one selected protocol level command, wherein said translating includes automatically selecting said selected protocol level command from a plurality of protocol level commands corresponding to respective management plane and control plane operations of said communications network; and wherein said request designates said path as a circuit switched path to carry said data packets of said one of said plurality of application programs over said communications network, and further comprising selecting said at least one protocol command to set said circuit switched path to carry said data packets of said one of said plurality of application programs over said communications network.

* * * * *